(12) United States Patent
Mikado et al.

(10) Patent No.: US 7,353,707 B2
(45) Date of Patent: Apr. 8, 2008

(54) ACCELERATION SENSOR

(75) Inventors: Atsushi Mikado, Toyama (JP); Jun Tabota, Toyama-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/540,239

(22) PCT Filed: Jul. 1, 2004

(86) PCT No.: PCT/JP2004/009314

§ 371 (c)(1),
(2), (4) Date: Jun. 22, 2005

(87) PCT Pub. No.: WO2005/012922

PCT Pub. Date: Feb. 10, 2005

(65) Prior Publication Data

US 2006/0081048 A1    Apr. 20, 2006

(30) Foreign Application Priority Data

Aug. 4, 2003    (JP) ............................. 2003-285517

(51) Int. Cl.
*G01P 15/10* (2006.01)
(52) U.S. Cl. .................. 73/514.34; 73/514.29
(58) Field of Classification Search ............ 73/514.34, 73/514.29, 514.16, 514.33; 310/329–332, 310/253, 311
See application file for complete search history.

(56) References Cited

U.S. PATENT DOCUMENTS 5,515,725 A * 5/1996 Tabota et al. ............ 73/514.34
6,588,276 B2 * 7/2003 Yamashita ............... 73/514.34
6,672,160 B2 * 1/2004 Tabota .................... 73/514.29
7,194,906 B2 * 3/2007 Mikado et al. .......... 73/514.34
2002/0069702 A1 * 6/2002 Tabota .................... 73/504.12

FOREIGN PATENT DOCUMENTS

| JP | 06-273439 | 9/1994 |
| JP | 2780594 | 5/1998 |
| JP | 2002-107372 | 4/2002 |

* cited by examiner

*Primary Examiner*—Hezron Williams
*Assistant Examiner*—Tamiko Bellamy
(74) *Attorney, Agent, or Firm*—Keating & Bennett, LLP

(57) ABSTRACT

An acceleration sensor in which a difference in resonance characteristics between two resonators can be easily adjusted even when casing components are already attached to an acceleration-sensor element includes a bimorph acceleration-sensor element having first and second resonators attached to opposite sides of a base plate with respect to a direction in which acceleration is applied. One longitudinal end or both longitudinal ends of the acceleration-sensor element is/are fixed such that the first and second resonators bend in the same direction in response to the acceleration. Changes in frequency or changes in impedance in the first and second resonators caused by the bending of the acceleration-sensor element are differentially detected in order to detect the acceleration. Opposite sides of the acceleration-sensor element with respect to the application direction of acceleration are respectively covered with a pair of casing components. Electrodes disposed on the main surfaces of the respective first and second resonators face one of opposite open planes defined by a combination of the acceleration-sensor element and the casing components with respect to a direction perpendicular to the application direction of acceleration. Accordingly, a trimming process for the electrodes can be readily performed.

7 Claims, 4 Drawing Sheets

FIG. 9

ACCELERATION SENSOR

BACKGROUND OF THE INVENTION

1. Technical Field of the Invention

The present invention relates to acceleration sensors, and particularly, to an acceleration sensor including a piezoelectric material.

2. Description of the Related Art

A known acceleration sensor including piezoelectric ceramics is, for example, disclosed in Japanese Patent No. 2780594, hereinafter referred to as Patent Document 1. Such an acceleration sensor is provided with a bimorph sensor element including a pair of piezoelectric units which are composed of piezoelectric ceramics and are integrally joined to each other in an opposing manner. The sensor element is held inside a casing in a double-supported fashion. When acceleration is applied to the acceleration sensor, the sensor element bends, thus generating stress in the piezoelectric units. The electric charge or voltage generated due to the piezoelectric effect is then detected in order to determine the acceleration. Acceleration sensors of this type are advantageous in view of their compactness and their capability of being formed easily into surface-mounted units (chip units).

In an acceleration sensor based on the above-described principle, a bias current flowing from a circuit is stored in a capacitor C of the piezoelectric material. In order to prevent the circuit from becoming saturated, a resistor R is required for allowing the bias current to be released. However, since the resistor R and the capacitor C define a high pass filter, the acceleration in the frequencies below the cut-off level, such as DC and low frequency, cannot be detected.

On the other hand, an acceleration sensor disclosed in Japanese Unexamined Patent Application Publication No. 2002-107372, hereinafter referred to as Patent Document 2, particularly, the acceleration sensor shown in FIG. 8 in Patent Document 2, includes a single base plate whose opposite sides respectively have first and second resonators formed of a piezoelectric material attached thereto so as to define an acceleration-sensor element, each of the first and second resonators having electrodes on opposite sides thereof. One longitudinal end or both longitudinal ends of the acceleration-sensor element is/are fixed such that the first and second resonators are bendable in their opposing direction in response to acceleration. When the acceleration-sensor element bends in response to the acceleration, changes in frequency or changes in impedance in the first and second resonators caused by the bending of the acceleration-sensor element are differentially detected in order to detect the acceleration.

In this case, the acceleration in a DC or low-frequency level can be detected. Moreover, the changes in frequency or the changes in impedance in the two resonators are differentially detected instead of being detected in a separate manner. This counterbalances the stress (for example, a stress caused by a change in temperature) applied to both resonators. Thus, a high-sensitivity acceleration sensor, which is unaffected by, for example, a change in temperature, is achieved. Furthermore, because the central bending plane (i.e., a plane where stress is 0) is set in the base plate, a large degree of tensile stress and compressive stress can be generated in the resonators disposed on the opposite sides of the base plate. Accordingly, this improves the sensitivity of the sensor.

The two opposite sides of the acceleration-sensor element with respect to a direction in which acceleration is applied are respectively covered with a pair of casing components, and moreover, two opposite open planes of the combination of the acceleration-sensor element and the casing components with respect to a direction perpendicular to the application direction of acceleration are respectively covered with a pair of cover components. Accordingly, a displacement portion of the acceleration-sensor element, which is bendable in response to acceleration, is disposed within an enclosed space, whereby an acceleration sensor suitable for a surface-mounted electronic unit is achieved.

In an acceleration sensor having such a packaged structure, even if the two resonators attached to the opposite sides of the base plate have completely the same resonance characteristic, there still may be a slight difference in the resonance characteristics between the two depending on, for example, the attachment conditions with the base plate or with the casing components. Such a difference in the resonance characteristics may be detected as an output signal even in a state where no acceleration is being applied.

For this reason, it is necessary to perform a characteristic-adjustment process, such as a trimming process, in a state where the casing components are attached to the acceleration-sensor element in order to prevent the difference in the resonance characteristics due to, for example, the attachment conditions. However, in the acceleration sensor disclosed in Patent Document 2, the electrodes of the two resonators face the base plate or the casing components, meaning that these electrodes are not exposed at the exterior of the acceleration-sensor element. Due to this reason, the trimming process cannot be performed on the resonators in a state where the casing components are attached to the acceleration-sensor element.

SUMMARY OF THE INVENTION

In order to overcome the problems described above, preferred embodiments of the present invention provide an acceleration sensor in which a difference in resonance characteristics between two resonators can be easily adjusted even when casing components are already attached to an acceleration-sensor element.

In addition, preferred embodiments of the present invention provide a compact, high-sensitivity acceleration sensor that is prevented from being affected by factors other than acceleration, such as a change in temperature or other factors.

According to a preferred embodiment of the present invention, an acceleration sensor includes a base plate, and first and second resonators each formed of a piezoelectric material and each having electrodes on two opposite main surfaces thereof, each resonator having a vibrating section at an intermediate portion of the resonator with respect to the longitudinal direction thereof. The first and second resonators are attached to opposite sides of the base plate with respect to a direction in which acceleration is applied so as to define a bimorph acceleration-sensor element, wherein one longitudinal end or both longitudinal ends of the acceleration-sensor element is/are fixed such that the first and second resonators bend in the same direction in response to the acceleration, and wherein changes in frequency or changes in impedance in the first and second resonators caused by the bending of the acceleration-sensor element are differentially detected in order to detect the acceleration. Opposite sides of the acceleration-sensor element with respect to the application direction of acceleration are respectively covered with a pair of casing components. The first and second resonators are attached to the base plate such that the electrodes of the first and second resonators face at least one of opposite open planes defined by a combination of the acceleration-sensor element and the casing components with respect to a direction that is substantially perpendicular to the application direction of acceleration.

In a case where the acceleration-sensor element has a bimorph structure in which the resonators are attached to the opposite sides of the single base plate, and the central bending plane is positioned at the central portion of the base plate with respect to the thickness of the base plate, when acceleration is applied to the acceleration-sensor element, the base plate functions as a mass body so as to effectively generate a tensile stress in one resonator and a compressive stress in the other resonator. In this case, the frequency in the resonator with tensile stress decreases while the frequency in the resonator with compressive stress increases. By differentially detecting the changes in frequency or the changes in impedance in the resonators, the acceleration can be detected. Moreover, since the changes in frequency or the changes in impedance in the two resonators are detected in a differential manner, the stress applied to both resonators (for example, a stress caused by a change in temperature) can be counterbalanced. Accordingly, a high-sensitivity acceleration sensor that is unaffected by, for example, a temperature change is provided.

Preferred embodiments of the present invention are arranged such that the opposite sides of the acceleration-sensor element with respect to the application direction of acceleration are respectively covered with a pair of casing components, and such that the first and second resonators are attached to the base plate in a manner such that the electrodes of the first and second resonators face at least one of the opposite open planes defined by the combination of the acceleration-sensor element and the casing components with respect to the direction that is substantially perpendicular to the application direction of acceleration. Specifically, since the electrodes of the first and second resonators are exposed at the at least one open plane, the trimming process for the electrodes can be performed easily, thereby solving the problem of the difference in characteristics between the two resonators. To prevent the difference in the resonance characteristics, a trimming process may be performed on each electrode by using, for example, laser. Alternatively, the electrodes may be coated with, for example, frequency-regulating ink.

There are, for example, two approaches for obtaining a signal proportional to the acceleration acting upon the acceleration-sensor element based on the signals differentially detected from the two resonators. One approach is to oscillate the first and second resonators separately with different frequencies, determine the oscillating-frequency difference, and obtain the signal proportional to the acceleration based on the frequency difference. The other approach is to oscillate the first and second resonators with the same frequency, detect the phase difference or the oscillation difference based on the difference in electric impedance between the resonators, and obtain the signal proportional to the acceleration based on the phase difference or the oscillation difference.

Furthermore, one of the opposite open planes defined by the combination of the acceleration-sensor element and the casing components with respect to the direction that is substantially perpendicular to the application direction of acceleration is preferably provided with a first electrode connected with one of the electrodes of the first resonator, a second electrode connected with one of the electrodes of the second resonator, and a third electrode connected with the other electrode of the first resonator and with the other electrode of the second resonator.

In this case, since three electrodes are exposed at the same surface, the resonance characteristics of the resonators can be easily measured by allowing terminals of a measuring device to come into contact with these electrodes. This is advantageous in that the trimming process can be readily performed.

Furthermore, the base plate and the first and second resonators are preferably formed of at least one material having substantially the same coefficient of thermal expansion.

If the coefficient of thermal expansion differs significantly between the base plate and the first and second resonators, a tensile stress or a compressive stress may be generated in the resonators due to a change in temperature in the environment even when no acceleration is applied. This leads to changes in frequency or changes in impedance. By allowing the base plate and the first and second resonators to have substantially the same coefficient of thermal expansion, the temperature drift related to the output from the sensor can be inhibited, thus reducing thermal hysteresis.

The base plate and the first and second resonators may be formed of the same material, or may be formed of different materials. The coefficient of thermal expansion between the base plate and the resonators may be different to an extent such that the changes in frequency or the changes in impedance in the resonators in an operating temperature limit are within an error range and are thus significantly small.

Furthermore, it is preferable that only one longitudinal end of the acceleration-sensor element is fixed, and that the opposite open planes defined by the combination of the acceleration-sensor element and the casing components with respect to the direction that is substantially perpendicular to the application direction of acceleration are respectively covered with a pair of cover components such that a displacement portion of the acceleration-sensor element, which is bendable in response to the acceleration, is disposed within an enclosed space. Such a packaged structure allows the displacement portion to be blocked from the outside, whereby a surface-mounted unit that is prevented from being affected by, for example, moisture and dust is provided.

Furthermore, one of the electrodes in each of the first and second resonators is preferably disposed at a free-end side of the resonator and is preferably connected with a common electrode via an extraction electrode provided on the base plate, the common electrode being provided at a fixed-end side of an outer surface of a combination of the casing components and the cover components. Moreover, the other electrode in the first resonator is preferably disposed at a base-end side of the first resonator, the electrode being connected with a first independent electrode provided at a free-end side of the outer surface of the combination of the casing components and the cover components, the electrode being connected with the first independent electrode via a first extraction electrode provided on one of the casing components. The other electrode in the second resonator is preferably disposed at a base-end side of the second resonator, the electrode being connected with a second independent electrode provided at the free-end side of the outer surface of the combination of the casing components and the cover components, the electrode being connected with the second independent electrode via a second extraction electrode provided on the other casing component.

When using an acceleration-sensor element of a cantilever structure, three electrodes are concentrated at the base-end portion of the acceleration-sensor element, and for this reason, it is difficult to set these electrodes distant from one another on the outer surface of the package. In order to set the three external electrodes distant from one another, one pair of the electrodes from the two resonators is connected to the common electrode, provided at the fixed-end side of the outer surface of the package (the combination of the casing components and the cover components), via the base plate, and the other pair of the two remaining electrodes is respectively connected to two independent electrodes, provided at a side of the outer surface opposite to the fixed-end side of the package, namely, the free-end side, via the casing components. Accordingly, when used as a surface-mounted unit, a short circuit is prevented from occurring among the electrodes.

Furthermore, a height of the first and second resonators in a direction that is substantially perpendicular to the application direction of acceleration is preferably smaller than a height of the base plate in the direction that is substantially perpendicular to the application direction of acceleration.

By allowing the first and second resonators to have a smaller height than the base plate in the direction that is substantially perpendicular to the application direction of acceleration, the cross-sectional area of the first and second resonators can be reduced. This increases the tensile stress and the compressive stress generated in the resonators in response to acceleration, thus improving the sensitivity (S/N ratio).

Furthermore, the first and second resonators are preferably attached to the opposite sides of the base plate at positions where the first and second resonators are opposed to each other.

Although it is possible to attach the two resonators to the opposite sides of the base plate at positions where the two resonators do not oppose each other, such a structure may lead to detection errors. In detail, this is due to the fact that if the acceleration-sensor element bends in response to an external force from a direction other than the application direction of acceleration (off-axis bending), the two resonators may generate different signals. In contrast, by attaching the two resonators to the opposite sides of the base plate at positions where the two resonators are opposed to each other, signals can be detected from the two resonators in a differential manner. Thus, the difference in detection with respect to the off-axis bending can be compensated for.

Furthermore, each of the first and second resonators is preferably attached to a central portion of the base plate with respect to a height direction of the base plate, the height direction being substantially perpendicular to the application direction of acceleration.

Consequently, in addition to being attached to the opposite sides of the base plate at positions where the two resonators are opposed to each other, each resonator may be attached to the central portion of the base plate with respect to the height direction. This structure can further compensate for the difference in detection since no stress acts upon the two resonators in response to off-axis bending.

Accordingly, preferred embodiments of the present invention provide an acceleration-sensor element having a bimorph structure in which resonators are attached to opposite sides of a base plate. When acceleration is applied to the acceleration-sensor element, changes in frequency or changes in impedance in the resonators are detected in a differential manner. Accordingly, a high-sensitivity acceleration sensor that is unaffected by, for example, a temperature change is provided.

Moreover, since the first and second resonators are attached to the base plate such that at least one of the electrodes on the corresponding main surface of each resonator faces one of opposite open planes defined by a combination of the acceleration-sensor element and the casing components with respect to a direction that is substantially perpendicular to the application direction of acceleration, an adjustment process for reducing the difference in characteristics between the two resonators can be readily performed. This solves the problem of the difference in characteristics between the two resonators. As a result, output signals are prevented from being generated when no acceleration is being applied, thus achieving less detection errors.

These and other features, elements, characteristics and advantages of the present invention will become more apparent from the following detailed description of preferred embodiments with reference to the attached drawings.

DETAILED DESCRIPTION OF PREFERRED EMBODIMENTS

Preferred embodiments of the present invention will now be described.

First Preferred Embodiment

FIGS. 1 to 5 illustrate an acceleration sensor according to a first preferred embodiment of the present invention.

Figure 1:
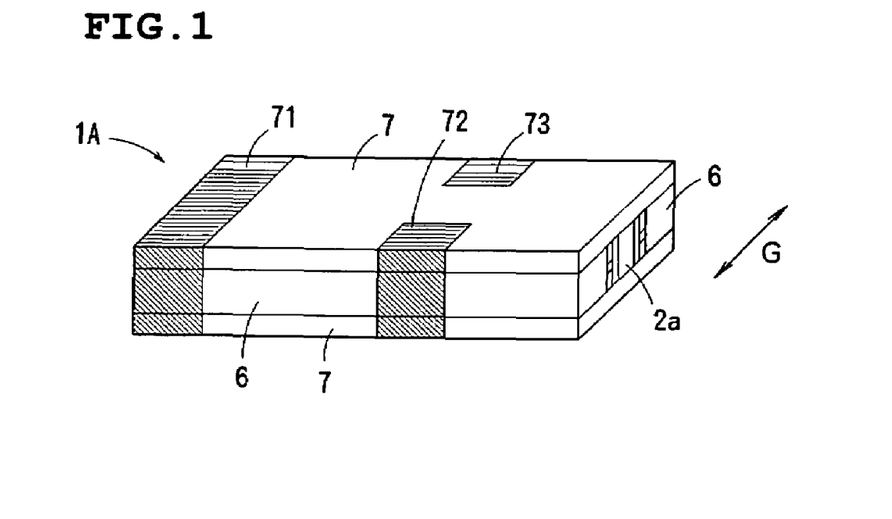
FIG. 1 is a schematic perspective view of an acceleration sensor according to a first preferred embodiment of the present invention.
Figure 2:
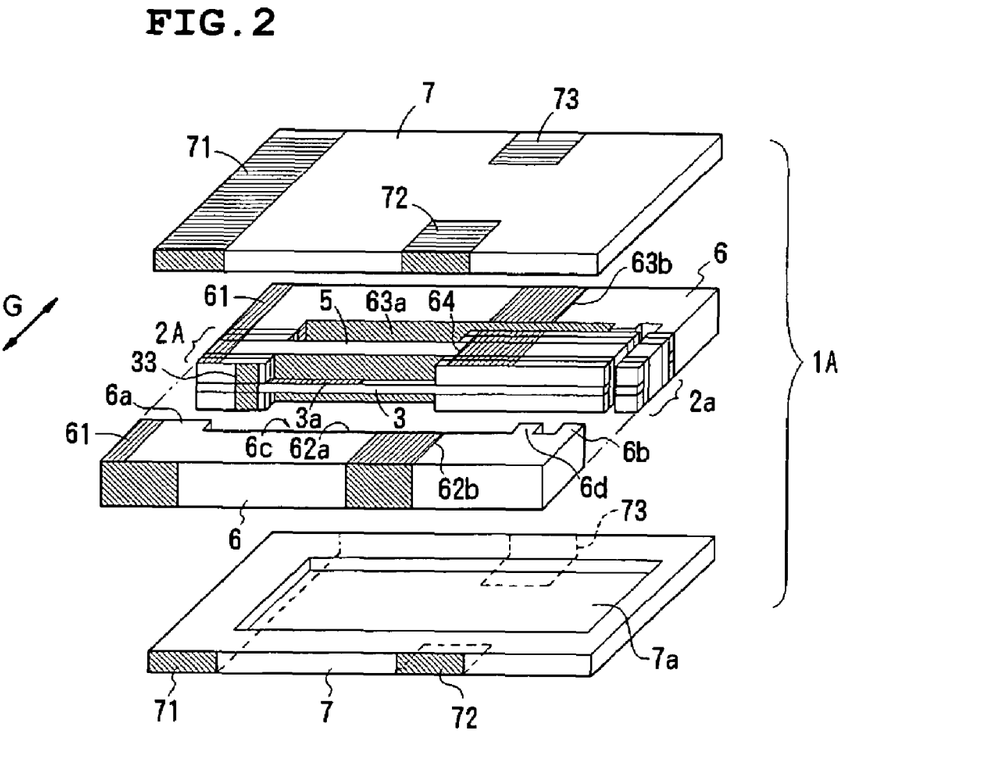
FIG. 2 is an exploded perspective view of the acceleration sensor shown in FIG. 1.
Figure 3:
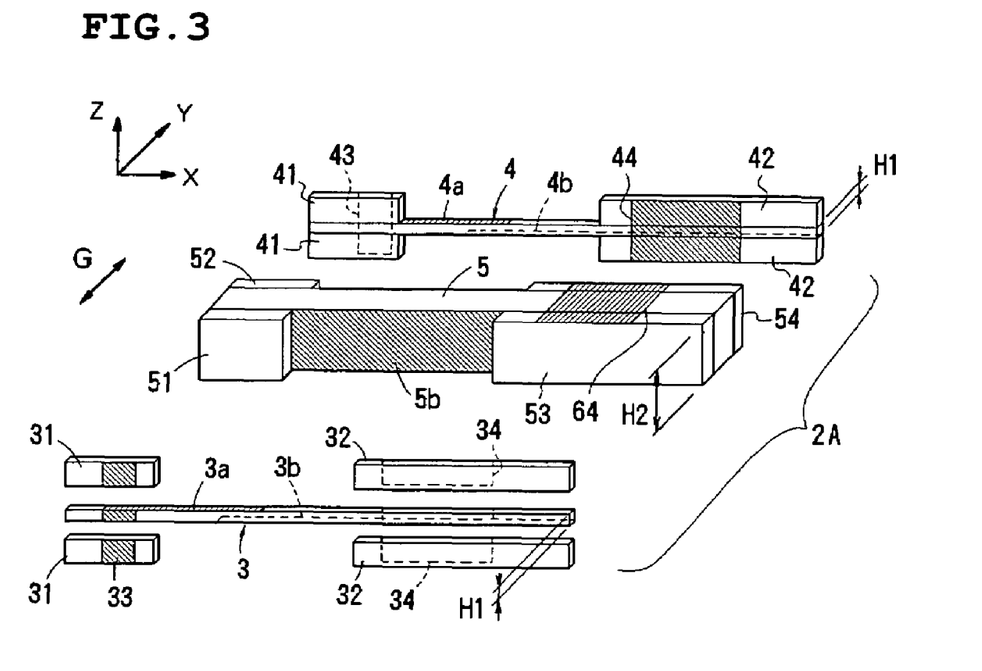
FIG. 3 is an exploded perspective view of an acceleration-sensor element provided in the acceleration sensor shown in FIG. 1.

An acceleration sensor 1A includes a bimorph acceleration-sensor element 2A supported in a cantilever manner by a pair of insulative casing components 6 and a pair of insulative cover components 7 composed of, for example, insulative ceramics. Referring to FIGS. 2 and 3, if the direction in which acceleration G is applied is defined as the y-axis direction, the longitudinal and height directions of the acceleration-sensor element 2A are defined as the x-axis direction and the z-axis direction, respectively.

The acceleration-sensor element 2A in the first preferred embodiment includes resonators 3 and 4 which are integrally attached to two respective opposite sides of a base plate 5 with respect to the application direction of acceleration (y-axis direction) via corresponding spacers 51 to 54. The resonators 3 and 4 are resonators of an energy-trap thickness-shear vibration type and each include a piezoelectric ceramic plate strip. The resonators 3 and 4 respectively include a pair of electrodes 3a and 3b and a pair of electrodes 4a and 4b. The electrodes 3a and 3b are respectively disposed on upper and lower main surfaces of the piezoelectric ceramic plate strip of the resonator 3, and the electrodes 4a and 4b are respectively disposed on upper and lower main surfaces of the piezoelectric ceramic plate strip of the resonator 4. One set of the electrodes 3a and 4a of the resonators 3 and 4 is exposed at the upper side of the acceleration-sensor element 2A, whereas the other set of the electrodes 3b and 4b is exposed at the lower side of the acceleration-sensor element 2A. A first-end portion of the electrode 3a on the upper surface of the resonator 3 is opposed to a second-end portion of the electrode 3b on the lower surface at an intermediate portion of the resonator 3 with respect to the longitudinal direction thereof. Similarly, a first-end portion of the electrode 4a on the upper surface of the resonator 4 is opposed to a second-end portion of the electrode 4b on the lower surface at an intermediate portion of the resonator 4 with respect to the longitudinal direction thereof. On the other hand, the second-end portion of the electrode 3a and the first-end portion of the electrode 3b extend away from each other towards the opposite ends of the resonator 3, and similarly, the second-end portion of the electrode 4a and the first-end portion of the electrode 4b extend away from each other towards the opposite ends of the resonator 4. The resonators 3 and 4 preferably have substantially the same height $H_1$ in the z-axis direction, and the height $H_1$ is determined based on the resonance frequency of the resonators 3 and 4. Since the height $H_1$ of the resonators 3 and 4 is smaller than a height $H_2$ of the base plate 5 in the z-axis direction, the stress generated in the resonators 3 and 4 due to acceleration applied to the resonators 3 and 4 is greater than in a case where $H_1=H_2$. In the first preferred embodiment, $H_1$ is preferably set at about ⅕ or less of $H_2$.

Figure 5A:
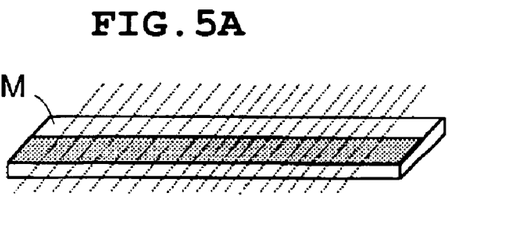
FIG. 5 includes perspective views illustrating a method for cutting a master substrate into segments in order to form resonators.
Figure 5B:
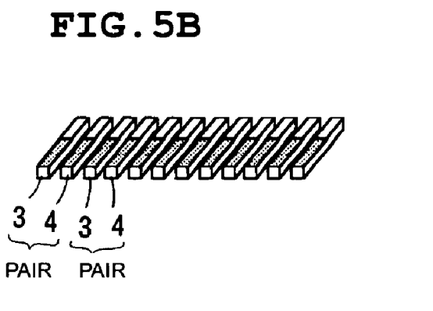

As shown in FIG. 5, the resonators 3 and 4 are preferably formed by cutting a single master piezoelectric substrate M into segments, and pairing adjacent cut segments so as to form pairs of resonators. This reduces the difference in the resonance characteristics including the temperature characteristics between the resonators of each pair. Accordingly, the difference in the output signal between the two resonators, which may be caused by a change in temperature, is reduced so as to achieve an acceleration sensor having less output fluctuation.

Even if the resonators 3 and 4 are a pair of adjacent segments cut from the same master piezoelectric substrate, there still may be cases where the resonance characteristics between the two resonators 3 and 4 are different due to, for example, being attached to the spacers and the base plate 5. Such different characteristics are output as an output signal even when no acceleration is being applied. The set of electrodes 3a and 4a of the respective resonators 3 and 4 is exposed at one side of the acceleration-sensor element 2A, and similarly, the set of electrodes 3b and 4b of the respective resonators 3 and 4 is exposed at the other side of the acceleration-sensor element 2A. Consequently, if the resonance characteristics between the resonators 3 and 4 are different, the electrodes exposed at the upper side or the lower side of the acceleration-sensor element 2A may be trimmed using, for example, laser, or may be coated with, for example, frequency-regulating ink so that the resonance characteristics can be adjusted in order to reduce the difference in the characteristics. Such a trimming process or an ink-coating process is performed after an attachment process of the casing components 6 and a fabrication process of internal electrodes 61, 62b, and 63b (see FIG. 4). In that case, since measuring terminals can come into contact with the three internal electrodes 61, 62b, and 63b disposed on the upper surface of the casing components 6, the trimming process can be performed easily while measuring the characteristics of the resonators 3 and 4. As a result, a high-precision acceleration sensor with less detection error can be provided.

The upper and lower main surfaces of the resonator 3 are provided with spacers 31 and 32 having the same thickness as the resonator 3. The spacers 31 and 32 are fixed adjacent to two respective opposite ends of the resonator 3 with respect to the longitudinal direction of the resonator 3. Similarly, the upper and lower main surfaces of the resonator 4 are provided with spacers 41 and 42 having the same thickness as the resonator 4. The spacers 41 and 42 are fixed adjacent to two respective opposite ends of the resonator 4 with respect to the longitudinal direction of the resonator 4. An area where the electrodes 3a and 3b are opposed to each other and an area where the electrodes 4a and 4b are opposed to each other define vibrating sections. Each vibrating section is disposed where the pairs of spacers 31 and 32 or the pairs of spacers 41 and 42 are not disposed. In the first preferred embodiment, the spacers 32 and 42 disposed adjacent to free ends of the respective resonators 3 and 4 have a greater length than the spacers 31 and 41 disposed adjacent to base ends of the respective resonators 3 and 4. For this reason, the vibrating sections of the resonators 3 and 4 are disposed close to the base end, i.e. a fixed end, of the acceleration-sensor element 2A. Because a stress generated in response to acceleration is greater towards the base end of a cantilever structure, providing the vibrating sections close to the base ends of the resonators 3 and 4 allows the resonators to receive a greater stress, thus improving the sensitivity of the sensor. The height of the combination of the resonator 3 and the spacers 31 or 32 and the height of the combination of the resonator 4 and the spacers 41 or 42 are preferably substantially equal to the height $H_2$ of the base plate 5.

Alternatively, the spacers 31, 32, 41, and 42 may be omitted such that the resonators 3 and 4 are directly attached to the two respective opposite sides of the base plate 5.

The resonators 3 and 4 are respectively attached to positions on the two opposite sides of the base plate 5 where the resonators 3 and 4 are opposed to each other, and particularly, are most preferably attached to the central portions of the base plate 5 with respect to the height direction of the base plate 5. This is due to the fact that even if the acceleration-sensor element were to bend in response to an external force from a direction other than the direction in which the acceleration is applied (off-axis bending), the difference in detection with respect to the off-axis bending can be compensated for by receiving signals from the two resonators 3 and 4 in a differential manner. The detection difference between the two resonators 3 and 4 opposed to each other is reduced due to the fact that, even in the case of off-axis bending, the same amount of stress acts upon the two resonators. In particular, attaching the two resonators 3 and 4 to the central positions of the base plate 5 with respect to the height direction of the base plate 5 further reduces the detection difference. Specifically, this is due to the fact that even when stress is generated in the resonators 3 and 4 due to off-axis bending, since each of the resonators 3 and 4 bends about a central bending plane with respect to the height direction, the stress is counterbalanced within the resonator 3 or 4.

One side surface of the combination of the resonator 3 and the spacers 31 with respect to the y-axis direction is provided with a connection electrode 33 connected with the electrode 3a of the resonator 3 and extending continuously across the side surface in the height direction (z-axis direction). Similarly, the other side surface of the combination of the resonator 3 and the spacers 32 with respect to the y-axis direction is provided with a connection electrode 34 connected with the electrode 3b of the resonator 3 and extending continuously across the side surface in the height direction (z-axis direction). On the other hand, one side surface of the combination of the resonator 4 and the spacers 41 with respect to the y-axis direction is provided with a connection electrode 43 connected with the electrode 4a of the resonator 4 and extending continuously across the side surface in the height direction (z-axis direction). Similarly, the other side surface of the combination of the resonator 4 and the spacers 42 with respect to the y-axis direction is provided with a connection electrode 44 connected with the electrode 4b of the resonator 4 and extending continuously across the side surface in the height direction (z-axis direction). Specifically, the connection electrodes 33 and 43 disposed close to the base ends of the resonators 3 and 4, respectively, are disposed on the outer side surface of the combination of the resonator 3 and the spacers 31 and the outer side surface of the combination of the resonator 4 and the spacers 41.

The base plate 5 is an insulative plate having the same length as the resonators 3 and 4, and is bendable with respect to a central bending plane (indicated by a dashed line N1 in FIG. 4) in response to acceleration G applied to the acceleration-sensor element 2A. The central bending plane is positioned at the central portion of the base plate 5 with respect to the thickness direction (y-axis direction) of the base plate 5. The base plate 5 and each of the resonators 3 and 4 have a gap 5a therebetween (see FIG. 5) which is given a wider dimension than the range in which the resonator 3 or 4 vibrates in an enclosed manner. In the first preferred embodiment, although the spacers 51 to 54 are attached to the corresponding sides of the base plate 5 and are separated by a predetermined distance in the longitudinal direction of the base plate 5 in order to form the gaps 5a, the opposite sides of the base plate 5 may alternatively be provided with depressions in place of the spacers. As a further alternative, the base plate 5 and each of the resonators 3 and 4 may have an adhesive layer therebetween having enough thickness for forming gaps.

The spacers 51 and 52 disposed adjacent to the base end preferably have substantially the same length as the spacers 31 and 41 disposed adjacent to the base ends of the respective resonators 3 and 4. Moreover, the height of the spacers 51 and 52 (in the z-axis direction) is preferably substantially the same as the height $H_2$ of the base plate 5. Similarly, the spacers 53 and 54 disposed adjacent to the free end have the same length as the spacers 32 and 42 disposed adjacent to the free ends of the respective resonators 3 and 4. Moreover, the height of the spacers 53 and 54 (in the z-axis direction) is preferably substantially the same as the height $H_2$ of the base plate 5.

The resonators 3 and 4, the spacers 31, 32, 41, and 42, the base plate 5, the spacers 51 to 54 define the acceleration-sensor element 2A and are composed of materials having the same coefficient of thermal expansion as that of the resonators 3 and 4 (for example, a ceramic material such as PZT). This prevents stress from being generated in the resonators 3 and 4 due to differences in thermal expansion caused by a change in temperature.

One side surface of the base plate 5 having the spacers 51 and 53 attached thereon is provided with an extraction electrode 5b extending over the entire length of the side surface. The extraction electrode 5b is connected with an internal electrode 61 extending continuously across the top surface of the base-end portion of the acceleration-sensor element 2A when the resonators 3 and 4 are in a combined state. On the other hand, an internal electrode 64 extends continuously across a free-end portion of the top surface of the combination of the base plate 5 and the spacers 53, 54, 32, and 42. The internal electrode 64 functions as a connector for interconnecting the extraction electrode 5b disposed on one side surface of the base plate 5 with the connection electrodes 34 and 44 disposed on the side surfaces of the respective resonators 3 and 4.

The two opposite sides of the acceleration-sensor element 2A with respect to the application direction of acceleration G are respectively covered with the pair of left and right casing components 6. Each casing component 6 is substantially U-shaped in cross section, and a projection 6a disposed adjacent to a first end of the casing component 6 is attached to the base-end portion of one of the opposite side surfaces of the acceleration-sensor element 2A. On the other hand, a projection 6b disposed adjacent to a second end of one casing component 6 is attached to a projection 6b of the other casing component 6 via a spacer 2a disposed therebetween. The spacer 2a according to the first preferred embodiment is formed by cutting a longitudinal end-segment of the acceleration-sensor element 2A, and includes portions of the base plate 5, the resonators 3 and 4, and the spacers 53, 54, 32, and 42. The projections 6a and 6b of each casing component 6 have a depression 6c disposed therebetween, which is a space where the acceleration-sensor element 2A is allowed to bend into. Moreover, each casing component 6 is provided with a stopper 6d disposed near an inner side of the second-end projection 6b. The stopper 6d restricts an over-displacement of the acceleration-sensor element 2A when a large amount of acceleration G is applied so as to prevent the acceleration-sensor element 2A from being deformed or damaged. If the degree of bending of the acceleration-sensor element 2A is extremely small and the bending spaces can thus be formed based on the thickness of adhesive layers between the casing components 6 and the acceleration-sensor element 2A, the depressions 6c and the stoppers 6d may be omitted.

The inner side surface and the top surface of one casing component 6 are respectively provided with extraction electrodes 62a and 62b which are connected with each other, and the inner side surface and the top surface of the other casing component 6 are respectively provided with extraction electrodes 63a and 63b which are connected with each other. The casing components 6 are joined with the acceleration-sensor element 2A via an electrically conductive adhesive for allowing the electrodes 33 and 62a to be electrically connected with each other, and the electrodes 43 and 63a to be electrically connected with each other. In this case, an anisotropic electrically-conductive adhesive is preferably used in order to prevent a short circuit between the internal electrode 61, extending continuously across the base-end portion of the top surface of the combination of the casing components 6 and the acceleration-sensor element 2A, and an external electrode 71, and between the electrode 33 and the electrode 43.

Figure 4:
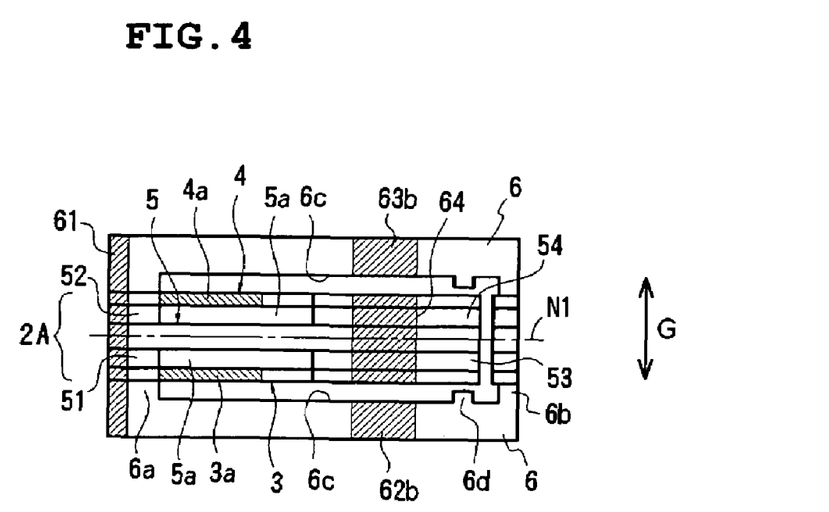
FIG. 4 is a plan view of the acceleration sensor shown in FIG. 1 in a state where cover components of the acceleration sensor are removed.

The extraction electrodes 62b and 63b disposed on the top surfaces of the corresponding casing components 6 are aligned with the internal electrode 64 disposed on the free-end portion of the top surface of the acceleration-sensor element 2A. The electrodes 62b, 63b, and 64 are formed after the casing components 6 are attached to the acceleration-sensor element 2A, and can be fabricated simultaneously by performing, for example, a sputtering process or a deposition process on the top surface of the combination of the casing components 6 and the acceleration-sensor element 2A. In this case, the internal electrode 61 can also be formed at the same time.

The upper and lower open planes of the combination of the acceleration-sensor element 2A and the casing components 6 are respectively covered with the pair of upper and lower cover components 7. The inner surface of each cover component 7 is provided with a cavity-forming recess 7a for preventing the acceleration-sensor element 2A from coming into contact with the cover component 7. A peripheral region surrounding the recess 7a is attached to one of the open planes. For this reason, a portion of the acceleration-sensor element 2A to be displaced in response to acceleration G is completely enclosed by the casing components 6 and the cover components 7. Similar to the casing components 6, the cavity-forming recess 7a in the inner surface of each cover component 7 may be omitted if the cavity can be formed based on the thickness of an adhesive layer provided along the frame region on the inner surface of the cover component 7.

The outer surface of each cover component 7 is provided with a portion of an external electrode 71 positioned adjacent to the base end of the acceleration-sensor element 2A, and portions of two external electrodes 72 and 73 positioned close to the free end of the acceleration-sensor element 2A. Referring to FIG. 1, the two external electrodes 72 and 73 are positioned distant from the external electrode 71 in the longitudinal direction (x-axis direction), and moreover, are disposed on two opposite sides from each other in the application direction of acceleration (y-axis direction). The positioning of the two external electrodes 72 and 73 is not limited to that shown in FIG. 1. Alternatively, the external electrodes 72 and 73 may be disposed at an end opposite to the end at which the external electrode 71 is disposed, such that the two electrodes 72 and 73 are disposed on opposite sides in the y-axis direction at that end.

The acceleration sensor 1A having the structure described above has the following conductive path.

Specifically, the upper electrode 3a of the resonator 3 is connected with the external electrode 72 via the connection electrode 33 and the extraction electrodes 62a and 62b. On the other hand, the upper electrode 4a of the resonator 4 is connected with the external electrode 73 via the connection electrode 43 and the extraction electrodes 63a and 63b. The lower electrodes 3b and 4b of the respective resonators 3 and 4 are interconnected with each other via the connection electrodes 34 and 44 and the internal electrode 64, and are connected with the external electrode 71 via the extraction electrode 5b disposed on one side surface of the base plate 5, and the internal electrode 61.

Although only one extraction electrode 5b is provided on one side surface of the base plate 5, two extraction electrodes 5b may alternatively be provided on the two opposite side surfaces of the base plate 5. This may contribute to a further prevention of disconnection of the conductive path.

Accordingly, a surface-mounted-chip acceleration sensor 1A is obtained.

Figure 6:
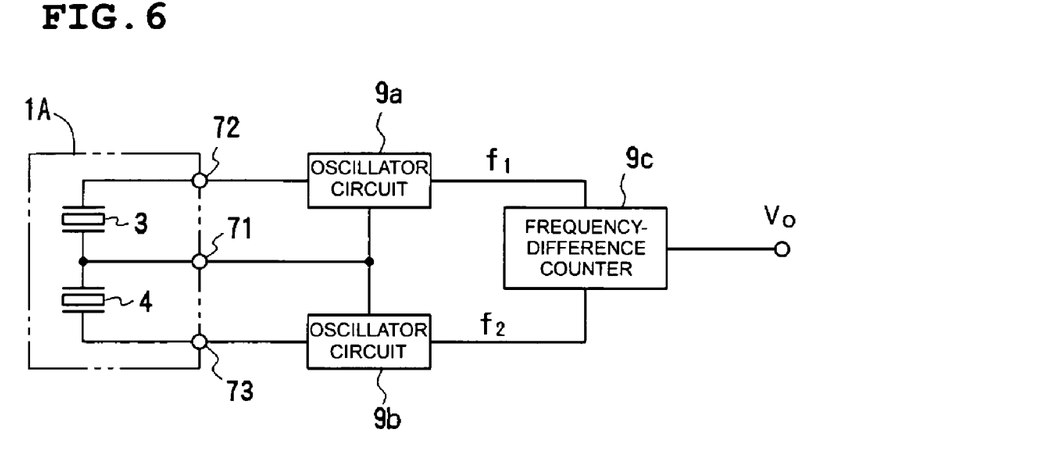
FIG. 6 is a circuit diagram of an example of an acceleration sensor device provided with the acceleration sensor according to a preferred embodiment of the present invention.

FIG. 6 is a circuit diagram of an example of an acceleration sensor device provided with the acceleration sensor 1A.

Such a sensor device utilizes separate oscillation effects of the acceleration-sensor element 2A. Specifically, the external electrodes 72 and 71 of the acceleration sensor 1A are connected with an oscillation circuit 9a, and the external electrodes 73 and 71 are connected with an oscillation circuit 9b. Each of the oscillation circuits 9a and 9b may be, for example, the commonly known Colpitts oscillation circuit. The resonators 3 and 4 are separately oscillated by the respective oscillation circuits 9a and 9b. The oscillating frequencies $f_1$ and $f_2$ are then input to a frequency-difference counter 9c. Subsequently, the frequency-difference counter 9c outputs a signal $V_0$, which is proportional to the difference in the frequencies.

When acceleration G is applied to the acceleration sensor 1A, an inertia force acts upon the acceleration-sensor element 2A in a direction opposite to the direction in which the acceleration is applied. This bends the acceleration-sensor element 2A in the opposite direction to the application direction of acceleration G. The bending of the acceleration-sensor element 2A generates stress, thus producing tensile stress in one of the resonators and compressive stress in the other resonator. In the case where resonators of a thickness-shear vibration type are used, the oscillating frequency of the resonator with tensile stress decreases, whereas the oscillating frequency of the resonator with compressive stress increases. Accordingly, the difference in the frequencies is obtained via the external electrodes 71, 72, and 73 so that the signal $V_0$ proportional to the acceleration G can be obtained.

Using the acceleration sensor 1A in an environment where there is a change in temperature may lead to thermal expansion of the resonators 3 and 4, the base plate 5, the casing components 6, and the cover components 7. If the coefficient of thermal expansion is different among the resonators 3 and 4 and the base plate 5, the acceleration-sensor element 2A may bend when the temperature changes, thus generating stress in the resonators 3 and 4. This means that the difference in the frequencies may change due to factors other than acceleration. On the other hand, if the resonators 3 and 4 and the base plate 5 are composed of materials having substantially the same coefficient of thermal expansion, the same amount of stress will be generated in response to a change in temperature. Consequently, the outputs from the two resonators 3 and 4 are received by the frequency-difference counter 9c in a differential manner, such that the changes in the output signals caused by, for example, a change in temperature affecting both resonators 3 and 4 can be counterbalanced. Accordingly, an acceleration sensor device having sensitivity that reacts only to acceleration G can be obtained.

On other hand, even if the coefficient of thermal expansion among the acceleration-sensor element 2A, the casing components 6, and the cover components 7 is different, a temperature change simply does not lead to a generation of stress in the acceleration-sensor element 2A since the acceleration-sensor element 2A is supported by these components only in a cantilever manner.

Figure 7:
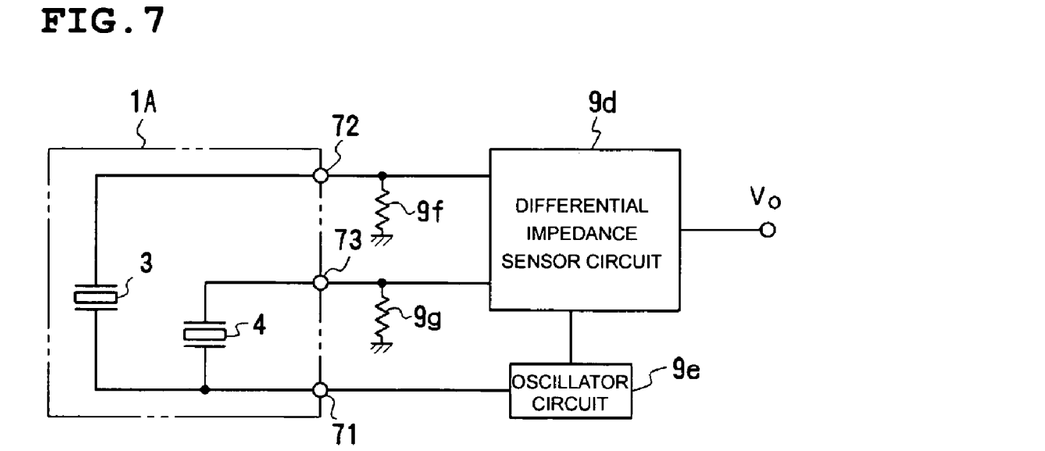
FIG. 7 is circuit diagram of another example of an acceleration sensor device provided with the acceleration sensor according to a preferred embodiment of the present invention.

FIG. 7 illustrates another example of an acceleration sensor device provided with the acceleration sensor 1A.

This acceleration sensor device utilizes a single oscillation effect of the acceleration-sensor element 2A. Specifically, the external electrodes 72 and 73 of the acceleration sensor 1A are connected with a differential impedance sensor circuit 9d, and the external electrode 71, which is a common electrode, is connected with an oscillation circuit 9e. Moreover, reference numerals 9f and 9g indicate matching resistors. In this case, both resonators 3 and 4 are oscillated with the same frequency by the oscillation circuit 9e, so that the phase difference or the oscillation difference can be detected based on the difference in electrical impedance between the resonators 3 and 4. Thus, the output $V_O$ proportional to acceleration G is obtained via the differential impedance sensor circuit 9d. In order to achieve oscillation with the same frequency, the oscillator circuit 9e may be formed in view of feedback on an output from one of the resonators or a combination of outputs from both resonators.

In this case, like the example shown in FIG. 6, a signal proportional to acceleration G can be obtained while also counterbalancing the changes in the outputs caused by, for example, a change in temperature. Accordingly, an acceleration sensor device having sensitivity solely against acceleration G can be obtained.

Second Preferred Embodiment

Figure 8:
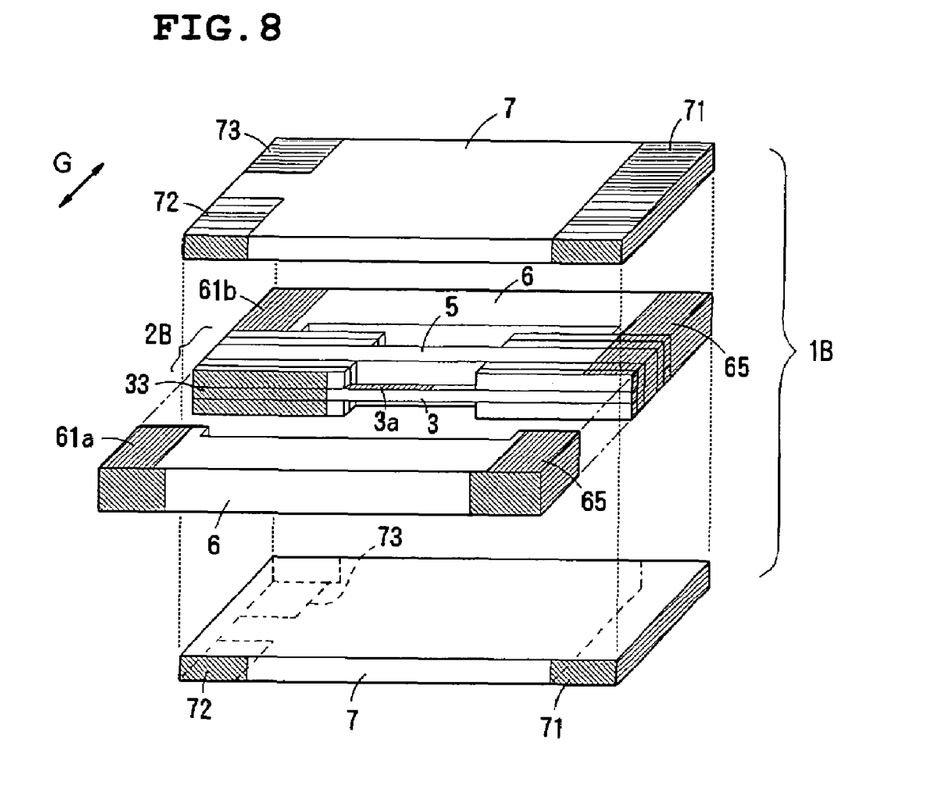
FIG. 8 is an exploded perspective view of an acceleration sensor according to a second preferred embodiment of the present invention.
Figure 9:
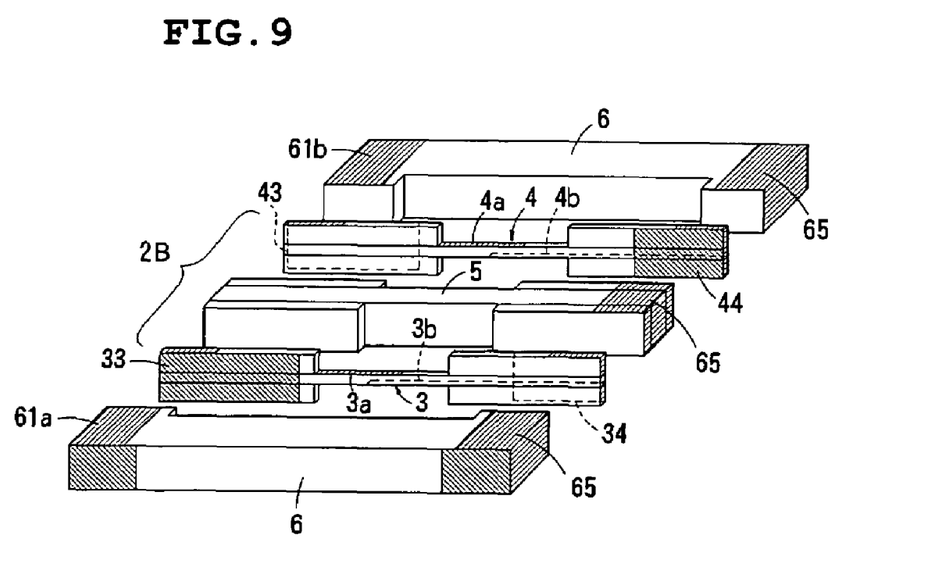
FIG. 9 is an exploded perspective view of the acceleration sensor shown in FIG. 8 in a state where cover components of the acceleration sensor are removed.

FIGS. 8 and 9 illustrate an acceleration sensor according to a second preferred embodiment.

An acceleration sensor 1B includes a bimorph acceleration-sensor element 2B held and enclosed by the casing components 6 and the cover components 7, which are formed of, for example, insulative ceramics, in a double-supported fashion. Components equivalent to those in the first preferred embodiment shown in FIGS. 1 to 4 are indicated by the same reference numerals, and descriptions of those components will thus be omitted.

The two longitudinal ends of the acceleration-sensor element 2B are fixedly supported by the pair of casing components 6 such that the acceleration-sensor element 2B horizontally intervenes the casing components 6. The casing components 6 are substantially U-shaped in cross section. Furthermore, the cover components 7 are respectively attached to the upper and lower open planes.

The upper electrodes 3a and 4a of the resonators 3 and 4 are respectively connected with internal electrodes 61a and 61b, which are disposed on first end-portions of the top surfaces of the casing components 6, via the connection electrodes 33 and 43. On the other hand, the lower electrodes 3b and 4b of the resonators 3 and 4 are connected with an internal electrode 65, extending continuously across the top surface of the combination of the acceleration-sensor element 2B and the casing components 6, via the respective connection electrodes 34 and 44. The internal electrodes 61a and 61b are respectively connected with the external electrodes 72 and 73 disposed on the outer surface of the cover components 7, whereas the internal electrode 65 is connected with the external electrode 71.

When using the acceleration-sensor element 2B of a double-supported structure as in the second preferred embodiment, signals can be detected from both longitudinal ends of the acceleration-sensor element 2B. Such a structure allows easier extraction of electrodes in comparison with the acceleration-sensor element 2A of a cantilever structure. For example, the extraction electrode 5b disposed on a side surface of the base plate 5 and the extraction electrodes 62a and 63a disposed on inner side surfaces of the casing components 6 can be omitted. Furthermore, the anisotropic electrically-conductive adhesive provided for connecting the connection electrodes 33 and 43 with the respective extraction electrodes 62a and 63a can also be omitted.

The acceleration sensor according to the present invention is not limited to the above-described preferred embodiments.

For example, although the resonators 3 and 4 used in the first and second preferred embodiments are of a thickness-shear vibration type, resonators of other alternative vibration types (such as a thickness-extensional vibration type or a longitudinal vibration type) may be used.

Furthermore, although the base plate and each of the first and second resonators in the above-described preferred embodiments have a gap therebetween given a wider dimension than the range in which the resonator vibrates in an enclosed manner, the base plate and each resonator may alternatively be joined with each other in an opposing manner such that the surfaces of the base plate and the resonator are entirely attached to each other. Such an entirely-attached state may cause deterioration of the performance (Q and K) of the resonators since the base plate limits the vibration of the resonators, but is effective in view of the efficiency for generating stress in response to the acceleration.

In the above-described preferred embodiments, the electrodes 3a and 3b of the resonator 3 and the electrodes 4a and 4b of the resonator 4 are exposed at the upper and lower sides with respect to the vertical direction (z-axis direction). Thus, the trimming process for the electrodes can be performed from both upper and lower sides. Alternatively, the electrodes may be exposed only at one of the upper and lower sides.

If the electrodes of the resonators 3 and 4 are exposed only at one of the upper and lower sides, the extraction electrodes 62b, 63b, 64 to be in contact with the terminals of a measuring device during the trimming process for the electrodes are preferably exposed at the same side as the electrodes of the resonators 3 and 4 in view of better workability for the trimming process.

Although the present invention has been described and illustrated in detail with reference to certain preferred embodiments thereof, it is clearly understood that the same is by way of illustration and example only and is not to be taken by way of limitation, the spirit and scope of the present invention being limited only by the terms of the appended claims.

The invention claimed is:

1. An acceleration sensor comprising:
   a base plate; and
   first and second resonators each including a piezoelectric material and each having electrodes on two opposite main surfaces thereof, each of the first and second resonators having a vibrating section at an intermediate portion of the respective resonator with respect to a longitudinal direction thereof; wherein
   the first and second resonators are attached to opposite sides of the base plate with respect to a direction in which acceleration is applied so as to define a bimorph acceleration-sensor element, at least one longitudinal end of the acceleration-sensor element is fixed such that the first and second resonators bend in the same direction in response to the acceleration, and changes in frequency or changes in impedance in the first and second resonators caused by the bending of the acceleration-sensor element are differentially detected in order to detect the acceleration;
   opposite sides of the acceleration-sensor element with respect to the application direction of acceleration are respectively covered with a pair of casing components; and the first and second resonators are attached to the base plate such that the electrodes of the first and second resonators face at least one of opposite open planes defined by a combination of the acceleration-sensor element and the casing components with respect to a direction that is substantially perpendicular to the application direction of acceleration.

2. The acceleration sensor according to claim 1, wherein one of the opposite open planes defined by the combination of the acceleration-sensor element and the casing components with respect to the direction that is substantially perpendicular to the application direction of acceleration is provided with a first electrode connected with one of the electrodes of the first resonator, a second electrode connected with one of the electrodes of the second resonator, and a third electrode connected with the other electrode of the first resonator and with the other electrode of the second resonator.

3. The acceleration sensor according to claim 1, wherein the base plate and the first and second resonators are made of at least one material having substantially the same coefficient of thermal expansion.

4. The acceleration sensor according to claim 1, wherein only one longitudinal end of the acceleration-sensor element is fixed, wherein the opposite open planes defined by the combination of the acceleration-sensor element and the casing components with respect to the direction that is substantially perpendicular to the application direction of acceleration are respectively covered with a pair of cover components such that a displacement portion of the acceleration-sensor element, which is bendable in response to the acceleration, is disposed within an enclosed space, one of the electrodes in each of the first and second resonators is disposed at a free-end side of the resonator and is connected with a common electrode via an extraction electrode provided on the base plate, the common electrode being provided at a fixed-end side of an outer surface of a combination of the casing components and the cover components, the other electrode in the first resonator is disposed at a base-end side of the first resonator, the electrode being connected with a first independent electrode provided at a free-end side of the outer surface of the combination of the casing components and the cover components, the electrode being connected with the first independent electrode via a first extraction electrode provided on one of the casing components, and the other electrode in the second resonator is disposed at a base-end side of the second resonator, said electrode being connected with a second independent electrode provided at the free-end side of the outer surface of the combination of the casing components and the cover components, said electrode being connected with the second independent electrode via a second extraction electrode provided on the other casing component.

5. The acceleration sensor according to claim 1, wherein a height of the first and second resonators in the direction that is substantially perpendicular to the application direction of acceleration is smaller than a height of the base plate in the direction that is substantially perpendicular to the application direction of acceleration.

6. The acceleration sensor according to claim 5, wherein the first and second resonators are attached to the opposite sides of the base plate at positions where the first and second resonators are opposed to each other.

7. The acceleration sensor according to claim 6, wherein each of the first and second resonators is attached to a central portion of the base plate with respect to a height direction of the base plate, the height direction being substantially perpendicular to the application direction of acceleration.

* * * * *